(12) United States Patent
Sehsah et al.

(10) Patent No.: US 10,603,607 B2
(45) Date of Patent: *Mar. 31, 2020

(54) METHOD AND APPARATUS FOR SMART ELECTROMAGNETIC SCREEN SYSTEM FOR USE IN DRILLING OPERATIONS

(71) Applicant: Saudi Arabian Oil Company, Dhahran (SA)

(72) Inventors: Ossama Sehsah, Dhahran (SA); Victor Carlos Costa de Oliveira, Dhahran (SA); Mario Augusto Rivas Martinez, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 268 days.

This patent is subject to a terminal disclaimer.

(21) Appl. No.: 15/788,278

(22) Filed: Oct. 19, 2017

(65) Prior Publication Data
US 2019/0118118 A1 Apr. 25, 2019

(51) Int. Cl.
*B01D 21/00* (2006.01)
*B01D 21/30* (2006.01)
(Continued)

(52) U.S. Cl.
CPC ....... *B01D 21/302* (2013.01); *B01D 21/0009* (2013.01); *B01D 21/283* (2013.01);
(Continued)

(58) Field of Classification Search
CPC .............. B01D 21/0009; B01D 21/283; B01D 21/302; B01D 35/02; B01D 2221/04; B01D 2313/083; B01D 2317/04; B01D 29/52; B01D 61/12; B01D 2259/80; B01D 2259/814; B01D 2311/2607; B01D 2311/2615; G05D 7/0641; E21B 21/065; E21B 21/06; E21B 21/063; E21B 21/08; E21B 21/10; E21B 21/106; E21B 43/34;
(Continued)

(56) References Cited

U.S. PATENT DOCUMENTS 5,362,962 A   11/1994 Barborak et al.
5,741,416 A    4/1998 Tempest, Jr.
(Continued)

OTHER PUBLICATIONS

International Search Report and Written Opinion for International Application No. PCT/US2018/056617 dated Feb. 18, 2019; pp. 1-14.

*Primary Examiner* — Pranav N Patel
(74) *Attorney, Agent, or Firm* — Bracewell LLP; Constance G. Rhebergen; Vivek P. Shankam

(57) ABSTRACT

An auto cleaning system for cleaning a drilling fluid in a drilling operation includes a first line, a second line, an auto clean pump operatively connected to the first line and the second line, and an electromagnetic device around at least a portion of the first line, wherein the electromagnetic device is energized when the drilling fluid is passing through the first line. The auto clean pump is configured to receive the drilling fluid from the first line or the second line and remove metal particles from the drilling fluid. The system also includes a controller configured to determine a pressure difference in a line, at least partially open a valve to divert drilling fluid intake from one line the other, and close the first entrance valve to stop the drilling fluid from entering the first line.

20 Claims, 5 Drawing Sheets

(51) Int. Cl.
    *B01D 35/02*     (2006.01)
    *E21B 21/06*     (2006.01)
    *G05D 7/06*     (2006.01)
    *B01D 21/28*     (2006.01)

(52) U.S. Cl.
    CPC ............ *B01D 35/02* (2013.01); *E21B 21/065* (2013.01); *G05D 7/0641* (2013.01)

(58) Field of Classification Search
    CPC . E21B 43/40; C02F 2209/005; C02F 2209/10
    See application file for complete search history.

(56) References Cited

U.S. PATENT DOCUMENTS

| | | |
|---|---|---|
| 6,557,630 B2 | 5/2003 | Harkins et al. |
| 6,609,573 B1 | 8/2003 | Day |
| 7,096,961 B2 | 8/2006 | Clark et al. |
| 8,127,867 B1 | 3/2012 | Droke |
| 8,236,182 B2 | 8/2012 | Lehman et al. |
| 8,528,665 B2 | 9/2013 | Jackson et al. |
| 9,194,216 B2 | 11/2015 | Lucas et al. |
| 2004/0256157 A1 | 12/2004 | Tessari et al. |
| 2007/0017674 A1 | 1/2007 | Blaisdell |
| 2007/0221413 A1 | 9/2007 | Sims et al. |
| 2011/0186523 A1 | 8/2011 | Williamson et al. |
| 2011/0198080 A1 | 8/2011 | Demong |
| 2013/0193072 A1 | 8/2013 | Booth |
| 2015/0048033 A1 | 2/2015 | Burns et al. |
| 2016/0097247 A1 | 4/2016 | Marco et al. |

METHOD AND APPARATUS FOR SMART ELECTROMAGNETIC SCREEN SYSTEM FOR USE IN DRILLING OPERATIONS

TECHNICAL FIELD

Example embodiments generally relate to automation in drilling operations, and more specifically relate to methods and systems for removing metal particles from the drilling fluid.

BACKGROUND

Hydraulic choke devices are commonly used in the oilfield when drilling or treating wells. Herein, the term "hydraulic choke" is taken to refer to the fact that the device is used with a variety of fluids, such as drilling mud, salt water, oil, gas, and other chemicals which may flow into or out from the well. "Hydraulic" does not herein refer to the choke actuation means. The hydraulic choke is utilized as a pressure-reducing valve for fluids flowing out of a well. The pressure of fluids emerging from a well flow control system must be reduced substantially in order to further process and store those fluids. A typical problem arising during operation of a hydraulic choke is a tendency for relatively large solid particulate matter to restrict or plug the choke, so that the choke's flow control becomes irregular. The particulate matter causing problems can be metal particles, drill cuttings, spelled segments of the downhole geologic formations, or debris from the drilling equipment. Conventional chokes are run without any screening of the fluid or other filtering of the well fluids.

Strainer screens are routinely used to remove large particulates from the outflow stream of wells, but, except for small in-line screens, this screening is done at atmospheric pressure on vibrating screens termed shale shakers for drilling. If a significant amount of particulate matter is present or flow is sustained over a long period, then a fixed screen device will become plugged and reduce fluid flow. In such a case, the plugged screen itself can structurally fail and add to the particulate matter in the flow stream.

Hydrocyclones are also used to separate heavier components, such as rock cuttings and metallic debris, from the outflowing fluid stream. However, such particulate removal systems are used at very low system pressures. Furthermore, hydrocyclones typically will not separate metal particles and particulates having relatively low specific gravities, such as rubber.

A system is needed to control the size of particles in the well fluid that passes through the piping upstream of the choke. There is also a need for a reliable means of removing particulate material from the outflow stream of a well so that strainer plugging by excessive particulate entrapment can be identified and remedied without interrupting the flow of the well. The means must be useable at very high pressures upstream of the hydraulic choke so that it can serve to protect the choke from clogging and flow damage accentuation resulting from particle entrapment in the choke.

SUMMARY

Accordingly, there exists a need for automation in this area of the drilling operation, and more specifically for an auto cleaning mechanism for regularly cleaning the drilling fluid from metallic debris in a drilling operation.

One example embodiment is an auto cleaning system for cleaning a drilling fluid in a drilling operation. The system includes a first line including a first entrance valve configured to allow the drilling fluid to flow into the first line, a first pressure sensor configured to measure a first pressure of the drilling fluid in the first line at an entrance point, a second pressure sensor configured to measure a second pressure of the drilling fluid in the first line at an exit point, and a first auto clean valve configured to allow the drilling fluid to flow out of the first line. The system also includes a second line including a second entrance valve configured to allow the drilling fluid to flow into the second line, and a second auto clean valve configured to allow the drilling fluid to flow out of the second line. The system also includes an auto clean pump operatively connected to the first auto clean valve and the second auto clean valve via an auto clean line, the auto clean pump configured to receive the drilling fluid from the first line or the second line and remove metal particles from the drilling fluid. The system further includes an electromagnetic device around at least a portion of the first line, wherein the electromagnetic device is electrically energized when the drilling fluid is passing through the first line. The system also includes a controller operatively connected at least to the first entrance valve, the first pressure sensor, the second pressure sensor, the first auto clean valve, the second entrance valve, the second auto clean valve, the auto clean pump, and the electromagnetic device, wherein the controller is configured to determine the difference between the second pressure and the first pressure is above a predetermined threshold value, at least partially open the second entrance valve to divert drilling fluid intake from the first line to the second line, and close the first entrance valve to stop the drilling fluid from entering the first line.

One example embodiment is a method for cleaning a drilling fluid in a drilling operation using an auto cleaning system. The method includes measuring, by a first pressure sensor installed on a first line, a first pressure of the drilling fluid at a first point, measuring, by a second pressure sensor installed on the first line, a second pressure of the drilling fluid at a second point, the first line having a first entrance valve configured to allow the drilling fluid to flow into the first line, and a first auto clean valve configured to allow the drilling fluid to flow out of the first line. The method also includes collecting metal particles from the drilling fluid by energizing an electromagnetic device around at least a portion of the first line. The method further includes determining, by a controller operatively connected to the first pressure sensor, the second pressure sensor, the first entrance valve, and the first auto clean valve, that a difference between the second pressure and the first pressure is above a predetermined threshold value, at least partially opening a second entrance valve configured to allow the drilling fluid to flow into a second line, and closing, by the controller, the first entrance valve to stop the drilling fluid from entering the first line.

One example embodiment is an auto cleaning system for cleaning a drilling fluid in a drilling operation. The system includes a first line including a first entrance valve configured to allow the drilling fluid to flow into the first line, a first pressure sensor configured to measure a first pressure of the drilling fluid in the first line at a first point, a second pressure sensor configured to measure a second pressure of the drilling fluid in the first line at a second point, and a first auto clean valve configured to allow the drilling fluid to flow out of the first line. The system also includes a second line including a second entrance valve configured to allow the drilling fluid to flow into the second line, and a second auto clean valve configured to allow the drilling fluid to flow out of the second line. The system further includes an electromagnetic device around at least a portion of the first line, wherein the electromagnetic device is energized when the drilling fluid is passing through the first line. The system also includes an auto clean pump operatively connected to the first auto clean valve and the second auto clean valve via an auto clean line, the auto clean pump configured to receive the drilling fluid from the first line or the second line and remove metal particles from the drilling fluid. The system also includes a controller operatively connected at least to the first entrance valve, the first pressure sensor, the second pressure sensor, the first auto clean valve, the second entrance valve, the second auto clean valve, and the auto clean pump, wherein the controller is configured to determine the difference between the second pressure and the first pressure is above a predetermined threshold value, at least partially open the second entrance valve to divert drilling fluid intake from the first line to the second line, and close the first entrance valve to stop the drilling fluid from entering the first line.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

Figure 1:
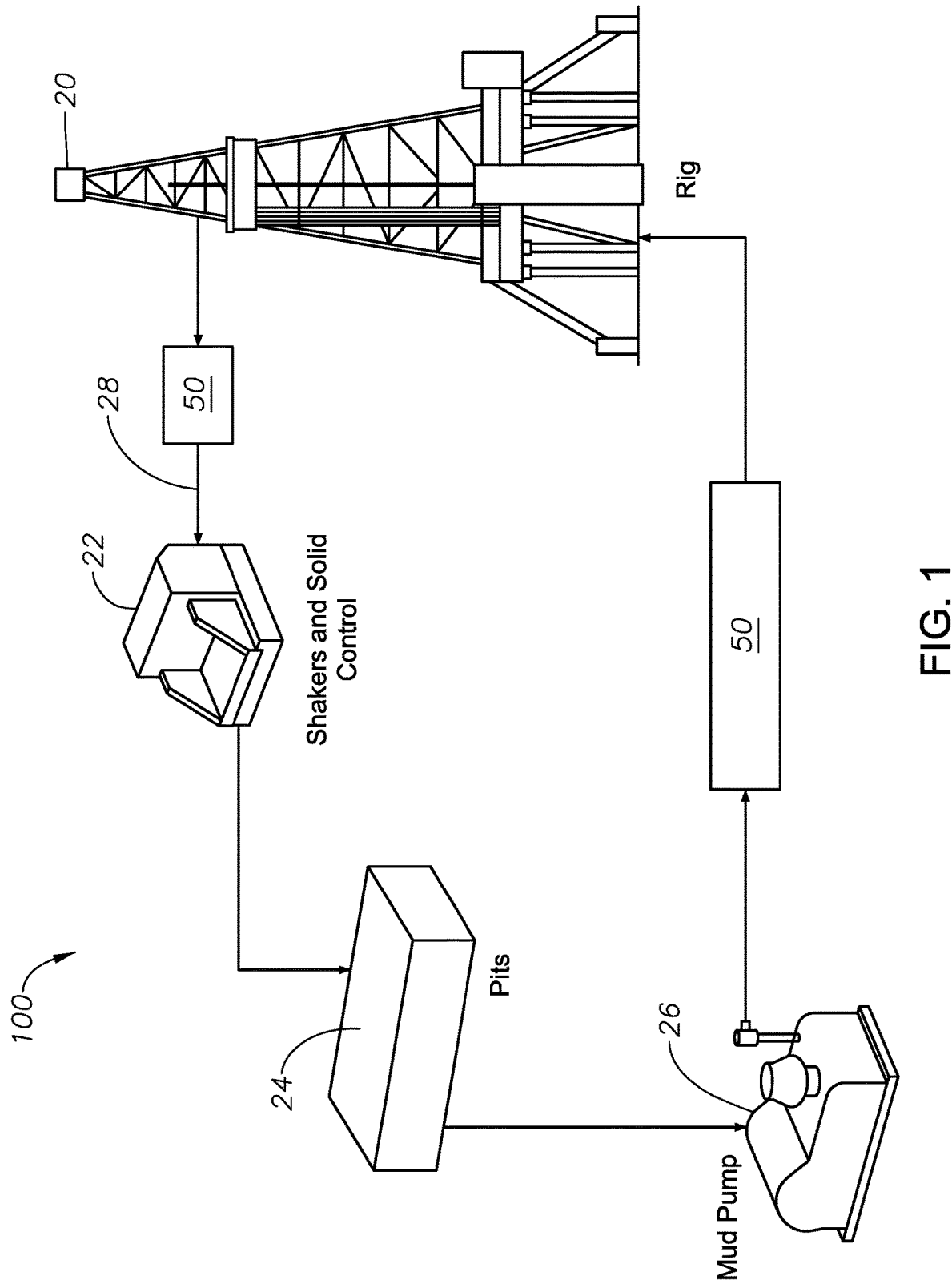
FIG. 1 is a schematic of a drilling rig with an example auto cleaning system for cleaning a drilling fluid in a drilling operation, according to one or more example embodiments of the disclosure.

Turning now to the figures, FIG. 1 is a schematic of a drilling rig 100 with an example auto cleaning system 50 for cleaning a drilling fluid in a drilling operation, according to one or more example embodiments of the disclosure. During the drilling operation, the drilling fluid or drilling mud may circulate from flow line of drilling rig 20 to shakers 22, from shakers 22 to mud pit 24, from mud pit 24 to mud pump 26, and from mud pump 26 back to the stand pipe or rig 20. As illustrated in this figure, the auto cleaning system 50 can be installed between drilling rig 20 and shakers 22, or between mud pump 26 and drilling rig 20. Each of the drilling equipment may be interconnected via a pipe line 28 that may transport the drilling fluid for performing the drilling operation.

Figure 2:
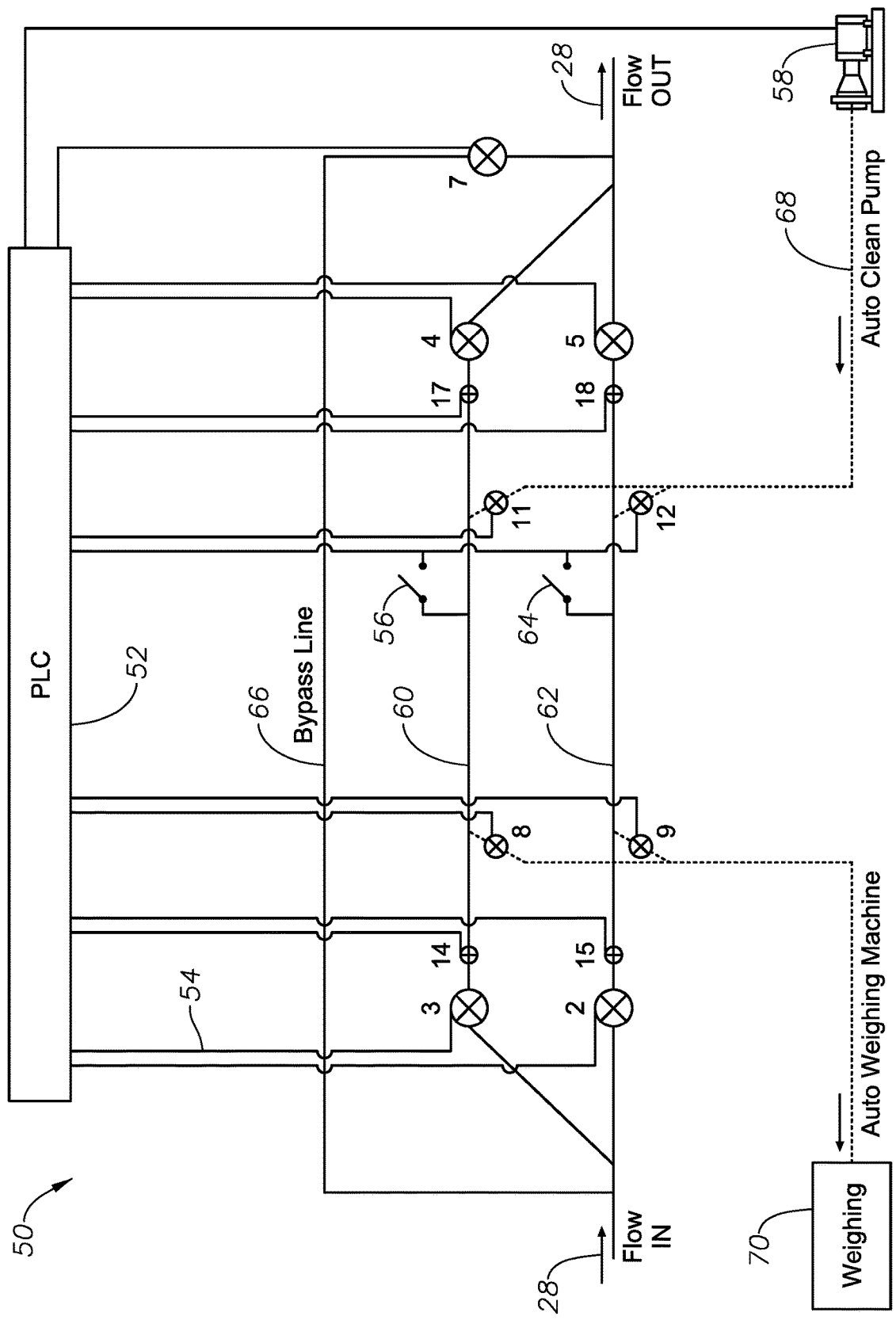
FIG. 2 illustrates an example auto cleaning system for cleaning a drilling fluid in a drilling operation, according to one or more example embodiments of the disclosure.

FIG. 2 illustrates the auto cleaning system 50 in further detail. The system 50 may be used for cleaning a drilling fluid in a drilling operation, according to one or more example embodiments of the disclosure. System 50 may include two pipe screens located in two independent lines 60, 62 that can be allocated between mud pumps and the rig or rig floor and shakers. The system 50 can be electronically monitored using individual pressure monitoring and the mud can pass through one line, while another line may work as a backup. The system 50 may be able to collect the metal particles on the mud going in/out of the hole, as well as determine the weight of this material. The information can also be delivered to the rig floor via monitor control, for example. The auto cleaning system 50 includes a close loop system without exposing the rig crew to any metal particles coming out of the hole. The system may be able to collect metal particles in the mud in real time without the need for installing magnets on the shakers during drilling operation.

The system is designed with two main lines 60, 62 that can be switched from each other according the pressure drop in each screen. As soon as the pressure increases in one line and goes beyond the previous input limits, the system 50 automatically switches to the next line, and the auto clean pump may be activated to clean the line and send the metal particles for weighing on the weighing machine. The system 50 can be installed in two different places on the rig system and operated independently, such as between rig pumps and rig floor. It can also be installed in the stand pipe, avoiding that materials coming from tanks from going into the drill pipe, for example, damaging the directional drilling equipment. The system 50 can also be installed between the rig floor and shakers. It can be installed in the flow line, so that it may work as another barrel to protect the metal particles from going to the mud tanks, and contaminating the mud system with the fine material, or it can be installed while drilling out the casing (open window) to perform a sidetrack.

The auto cleaning system 50 includes a first line 60 including a first entrance valve 3 configured to allow the drilling fluid to flow into the first line 60, a first exit valve 4, a first pressure sensor 14 configured to measure a first pressure of the drilling fluid in the first line 60 at an entrance point, a second pressure sensor 17 configured to measure a second pressure of the drilling fluid in the first line 60 at an exit point, a first auto clean valve 8 and a second auto clean valve 11 configured to allow the drilling fluid to flow out of the first line 60. The system also includes a second line 62 including a second entrance valve 2 configured to allow the drilling fluid to flow into the second line 62, a second exit valve 5, a third pressure sensor 15 configured to measure a third pressure of the drilling fluid in the second line 62 at an entrance point, a fourth pressure sensor 18 configured to measure a fourth pressure of the drilling fluid in the second line 62 at an exit point, a third auto clean valve 9 and a fourth auto clean valve 12 configured to allow the drilling fluid to flow out of the second line 62. The system 50 may also include an auto clean pump 58 operatively connected to the first auto clean valve 8, the second auto clean valve 11, the third auto clean valve 9, and the fourth auto clean valve 12 via an auto clean line. The auto clean pump 58 may be configured to receive the drilling fluid from the first line 60 or the second line 62 and remove metal particles from the drilling fluid. The auto clean pump 58 receives the drilling fluid from these lines backwards so they can flush the debris out of the line. The system 50 further includes an electromagnetic device 75 (shown in FIG. 3) around at least a portion of the first line 60 and the second line 62. The electromagnetic device 75 is energized when the drilling fluid is passing through a line. The system 50 also includes a controller 52, such as a PLC, that is operatively connected at least to valves 2-4, 7, pressure sensors 14, 15, 17, 18, auto clean valves 8, 9, 11, 12 via lines 54 for controlling an operation thereof. The controller 52 according to this embodiment may be configured to determine that the difference between the second pressure and the first pressure is above a predetermined threshold value, and at least partially open the second entrance valve 2 to divert drilling fluid intake from the first line 60 to the second line 62, and close the first entrance valve 3 to stop the drilling fluid from entering the first line 60.

The controller 52 may further be configured to at least partially open the first auto clean valve 8 and/or auto clean valve 11 to divert the drilling fluid in the first line 60 to the auto clean pump 58 for removal of the metal particles from the drilling fluid. The controller 52 may also be further configured to de-energize the electromagnetic device 75 after at least partially opening the first auto clean valve 8 to divert the drilling fluid in the first line 60 to the auto clean pump 58 for removal of the metal particles from the drilling fluid.

In a further example, the controller may determine the difference between the third pressure and the fourth pressure is above the predetermined threshold value, and at least partially open the entrance valve 3 to divert drilling fluid intake from the second line 62 to the first line 60, and close the entrance valve 2 to stop the drilling fluid from entering the second line 62. A weighing machine 70 may be operatively connected to the first auto clean valve 8 and the second auto clean valve 9 via the auto clean line 68, and the weighing machine may be configured to weigh the metal particles in the drilling fluid. All of the entrance valves used in the example embodiments may include High Closing Ratio or Hydraulic Control Remote (HCR) valves.

In one example embodiment, the electromagnetic screen system 50 is able to collect the material particles in the mud and send it to a weighing machine 70 for weighing, which can then inform drillers about the real weight of metal that has been collected. A total amount of metal weight can be updated and displayed on the rig floor via a real time monitoring screen, for example. In one example embodiment, if line 60 is active, the system automatically keep valves 3 and 4 open, and closes valves 2, 5, 7, 8, 9, 11 and 12 so the flow will pass throughout line 60. The electromagnetic system on this line 60 may be activated via switch 56 so that the electromagnetic device 75 (shown in FIG. 3) is able to collect the metal particles. In order to switch from line 60 to 62, the system 50 may automatically open valves 2 and 5, and close valves 3, 4, 7, 8, 9, 11 and 12 so the flow may pass throughout line 62. The electromagnetic system on this line 62 may be activated at this time in order to be able to collect the metal particles in line 62.

In order to flush line 60, valves 3, 4, 7, 9, 12 may be automatically closed, and valves 8 and 11 may be open. After that, the electromagnetic system may release the metal particles previously collected and now the auto clean pump may be activated, sending the metal particles to be collected in the weighing machine 70. In order to flush line 62, valves 2, 5, 7, 8, 11 may be automatically closed, and valves 3, 4, 9 and 12 may be open. After that, the electromagnetic system may release the metal particles previously collected and now the auto clean pump 58 may be activated, sending the metal particles to be collected in the weighing machine 70. In order to activate the bypass line 66, valves 2, 3, 4, 5, 8, 9, 11, and 12 may be automatically closed, and valves 7 may be open so the flow may be direct to the bypass line 66. Signals can be sent to a PLC 52 with a monitor or human machine interface (HMI) to analyze and alarm, and also can operate an actuated valve to switch/divert the suction intake to a backup suction until fixing the problem.

Figure 3:
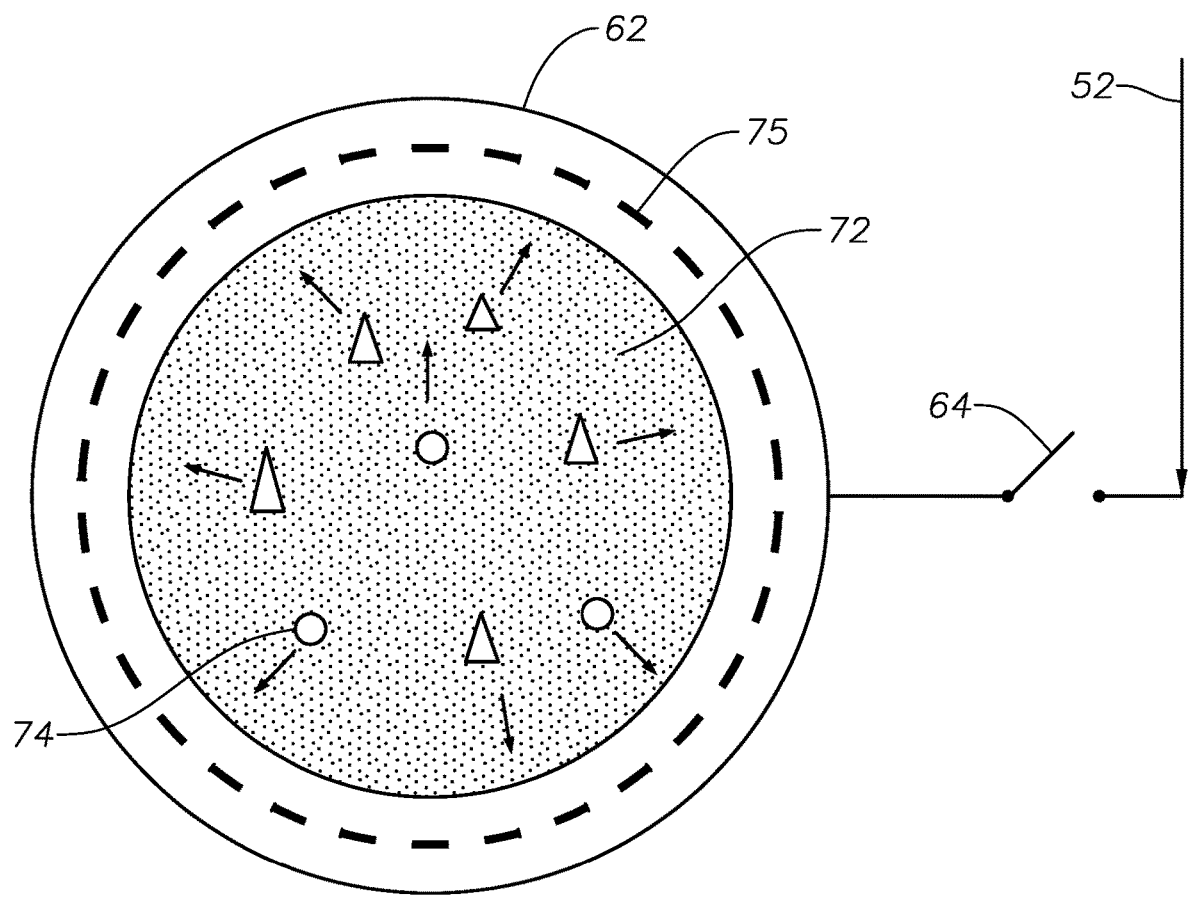
FIG. 3 illustrates an electromagnetic component of an example auto cleaning system for cleaning a drilling fluid in a drilling operation, according to one or more example embodiments of the disclosure.

FIG. 3 illustrates an electromagnetic component 75 of an example auto cleaning system 50 for cleaning a drilling fluid in a drilling operation, according to one or more example embodiments of the disclosure. In this embodiment, an electromagnetic system or device 75 is installed around lines 60, 62 so as to collect metal particles from the drilling fluid. The device 75 may be energized by the controller 52 any time there is fluid flowing in a line. The controller 52 may do so by closing the electric switch 64 and completing the circuit. As a result of the energization, the metal particles 74 in the drilling fluid 72 get collected on an inner surface of the line 60, 62. When the controller 52 de-energizes the device 75 by opening the switch 64, the metal particles are dislodged and sent to the weighing machine 70 for weighing and displaying the weight to operation personnel.

Figure 4:
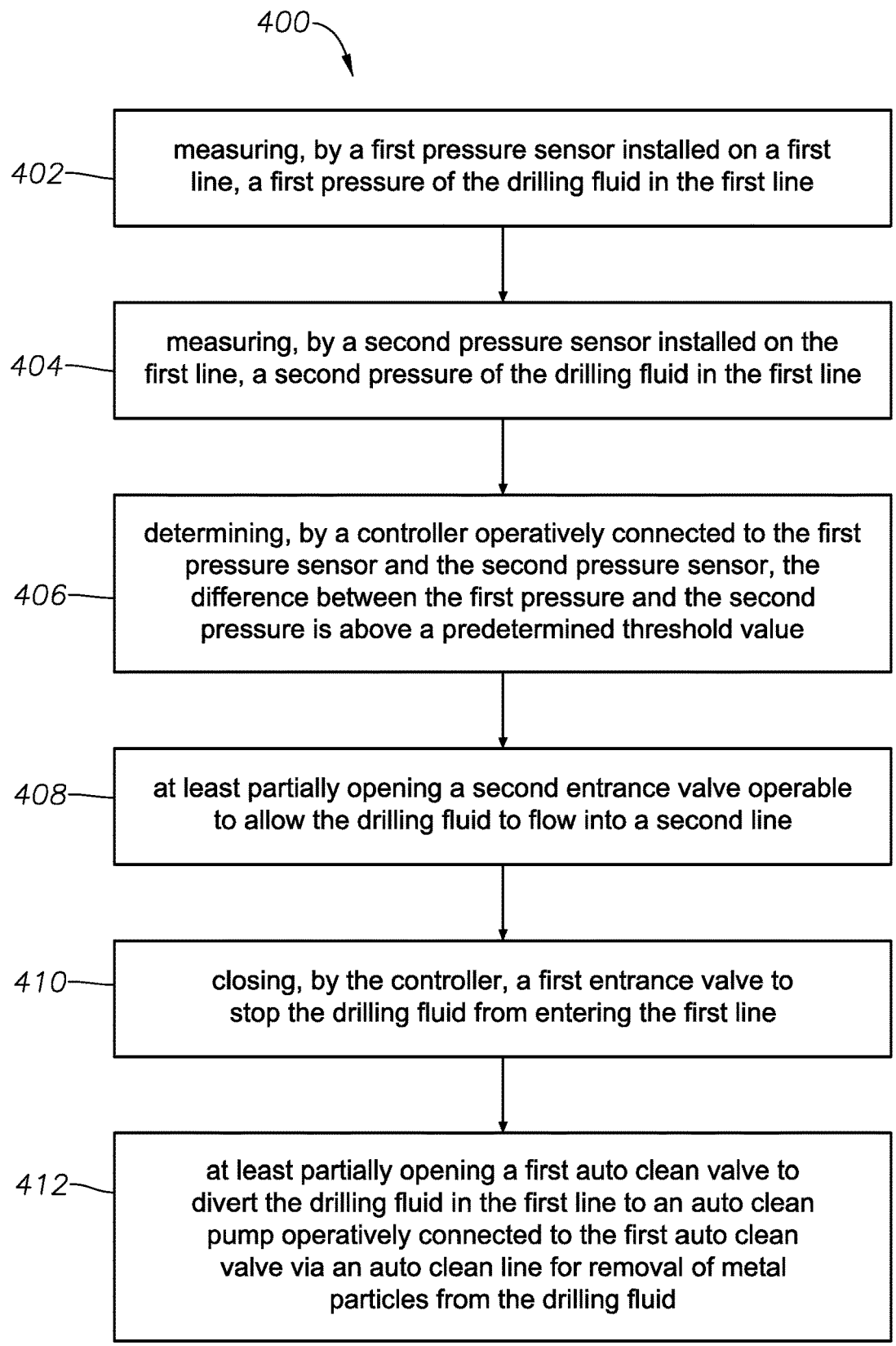
FIG. 4 illustrates example operations in a method for auto cleaning a drilling fluid in a drilling operation, according to one or more example embodiments of the disclosure.

FIG. 4 illustrates example operations in a method 400 for auto cleaning a drilling fluid in a drilling operation, according to one or more example embodiments of the disclosure. For purposes of simplicity of explanation, the example method disclosed herein is presented and described as a series of blocks (with each block representing an action or an operation in a method, for example). However, it is to be understood and appreciated that the disclosed method is not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

The method 400 includes at step 402, measuring, by a first pressure sensor installed on a first line, a first pressure of the drilling fluid at a first point. The first point can be, for example, an entrance point on the first line. The method further includes at step 404, measuring, by a second pressure sensor installed on the first line, a second pressure of the drilling fluid at a second point. The second point can be, for example, and exit point on the first line. The first line may include a first entrance valve configured to allow the drilling fluid to flow into the first line, and a first auto clean valve configured to allow the drilling fluid to flow out of the first line. The method 400 further includes, at step 406, determining, by a controller operatively connected to the first pressure sensor, the second pressure sensor, the first entrance valve, and the first auto clean valve, that a difference between the second pressure and the first pressure is above a predetermined threshold value. At step 408, the controller at least partially opens a second entrance valve configured to allow the drilling fluid to flow into a second line, and step 410 the controller causes to close the first entrance valve to stop the drilling fluid from entering the first line. The method also includes, at step 412, the controller at least partially opening the first auto clean valve to divert the drilling fluid in the first line to an auto clean pump operatively connected to the first auto clean valve via an auto clean line for removal of metal particles from the drilling fluid. The method may also include receiving, by the auto clean pump, the drilling fluid from the first line to remove metal particles from the drilling fluid.

Figure 5:
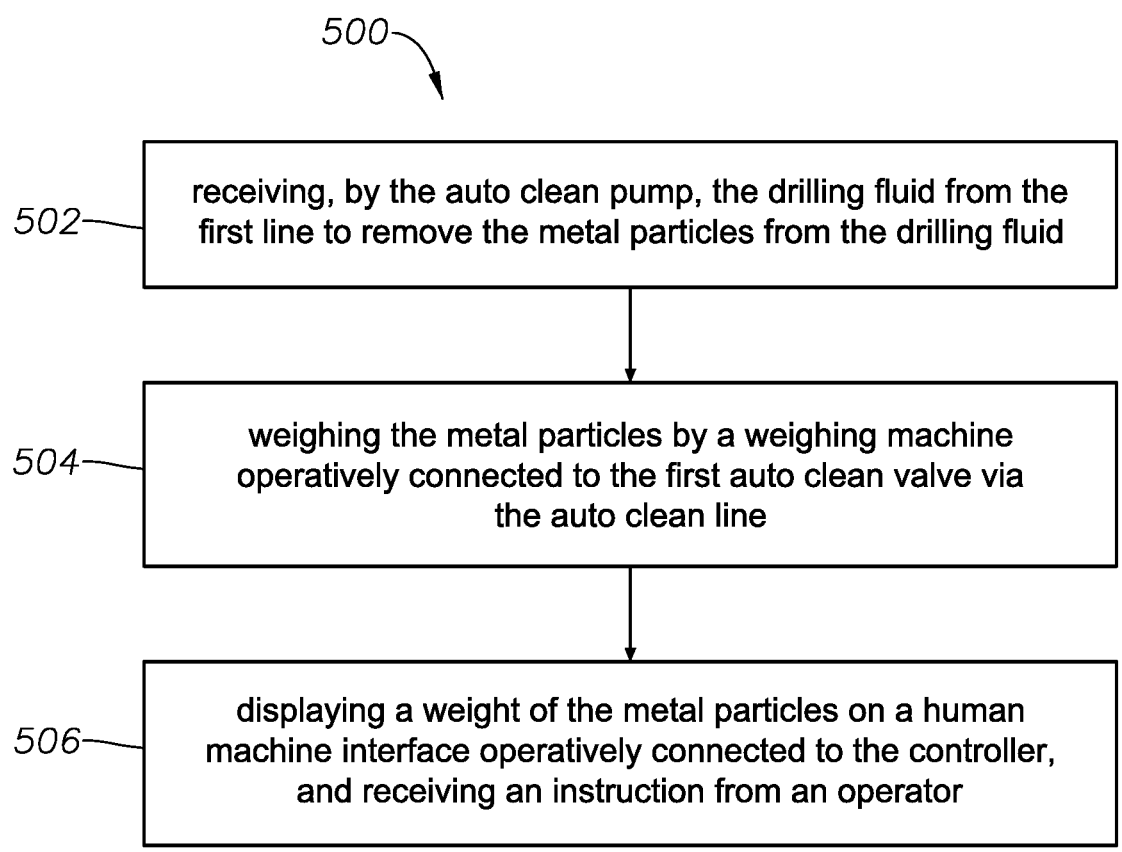
FIG. 5 illustrates example operations in a method for auto cleaning a drilling fluid in a drilling operation, according to one or more example embodiments of the disclosure.

FIG. 5 illustrates example operations in a method 500 for auto cleaning a drilling fluid in a drilling operation, according to one or more example embodiments of the disclosure. The method 500 may include at step 502 receiving, by the auto clean pump 58, the drilling fluid from the first line 60 to remove metal particles from the drilling fluid. The method may further include determining, by the controller 52 operatively connected to a first exit valve 4 operable to allow the drilling fluid to flow out of the first line 60, and a third pressure sensor 17 for measuring a third pressure of the drilling fluid in the first line 60, the third pressure is above the predetermined threshold value, and closing the first exit valve 4 to stop the drilling fluid from exiting the first line 60. The method may also include at least partially opening a third auto clean valve 11 operable to allow the drilling fluid to flow out of the first line 60 into the auto clean pump 58 for removal of metal particles from the drilling fluid. The method may further include at step 504 weighing the metal particles in the drilling fluid, by a weighing machine 70 operatively connected to the first auto clean valve 8 via the auto clean line 68. The method 500 may also include at step 506 displaying a weight of the metal particles on a human machine interface operatively connected to the controller, and receiving an instruction from an operator. The phrase "at least partially opening the valve" refers to the operation of at least partially opening the valve. For example, a valve may be partially open or completely open at a certain point in time. As described herein, the phrase "at least partially open" covers both scenarios where a valve may be partially or fully open.

In one example embodiment, the auto cleaning system 50 can also include a human machine interface (not shown) that may be connected to the controller for displaying a message and receiving an instruction from an operator. The controller 52 may actuate any of the valves 2-12 based on an input received form the operator.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method has been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. An auto cleaning system for cleaning a drilling fluid in a drilling operation, the auto cleaning system comprising:
    a first line comprising a first entrance valve configured to allow the drilling fluid to flow into the first line, a first pressure sensor configured to measure a first pressure of the drilling fluid in the first line at an entrance point, a second pressure sensor configured to measure a second pressure of the drilling fluid in the first line at an exit point, and a first auto clean valve configured to allow the drilling fluid to flow out of the first line;
    a second line comprising a second entrance valve configured to allow the drilling fluid to flow into the second line, and a second auto clean valve configured to allow the drilling fluid to flow out of the second line;
    an auto clean pump operatively connected to the first auto clean valve and the second auto clean valve via an auto clean line, the auto clean pump configured to receive the drilling fluid from the first line or the second line and remove metal particles from the drilling fluid;

an electromagnetic device around at least a portion of the first line, wherein the electromagnetic device is energized when the drilling fluid is passing through the first line; and a controller operatively connected at least to the first entrance valve, the first pressure sensor, the second pressure sensor, the first auto clean valve, the second entrance valve, the second auto clean valve, the auto clean pump, and the electromagnetic device, wherein the controller is configured to:

determine the difference between the second pressure and the first pressure is above a predetermined threshold value;

at least partially open the second entrance valve to divert drilling fluid intake from the first line to the second line; and close the first entrance valve to stop the drilling fluid from entering the first line.

2. The auto cleaning system of claim 1, wherein the controller is further configured to at least partially open the first auto clean valve to divert the drilling fluid in the first line to the auto clean pump for removal of the metal particles from the drilling fluid.

3. The auto cleaning system of claim 2, wherein the controller is further configured to de-energize the electromagnetic device after at least partially opening the first auto clean valve to divert the drilling fluid in the first line to the auto clean pump for removal of the metal particles from the drilling fluid.

4. The auto cleaning system of claim 1, wherein the second line further comprises a third pressure sensor configured to measure a third pressure of the drilling fluid in the second line at an entrance point, and a fourth pressure sensor configured to measure a fourth pressure of the drilling fluid in the second line at an exit point, wherein the controller is operatively connected to the third pressure sensor, the fourth pressure sensor, wherein the controller is configured to:

determine the difference between the third pressure and the fourth pressure is above the predetermined threshold value;

at least partially open the first entrance valve to divert drilling fluid intake from the second line to the first line; and close the second entrance valve to stop the drilling fluid from entering the second line.

5. The auto cleaning system of claim 1, further comprising:

a weighing machine operatively connected to the first auto clean valve and the second auto clean valve via the auto clean line, the weighing machine configured to weigh the metal particles in the drilling fluid.

6. The auto cleaning system of claim 1, wherein the first entrance valve and the second entrance valve comprise a High Closing Ratio or Hydraulic Control Remote (HCR) valve.

7. The auto cleaning system of claim 1, further comprising:

a bypass line controlled by a dedicated bypass valve connected to the controller, the dedicated bypass valve configured to allow the drilling fluid to bypass the auto cleaning system.

8. The auto cleaning system of claim 1, further comprising:

a human machine interface operatively connected to the controller for displaying an alert message when the drilling fluid is switched from the first line to the second line, and receiving an instruction from an operator.

9. The auto cleaning system of claim 1, wherein the auto cleaning system is installed between a mud pump and a standpipe of the drilling rig or between the standpipe of the drilling rig and a shaker.

10. A method for cleaning a drilling fluid in a drilling operation using an auto cleaning system, the method comprising:

measuring, by a first pressure sensor installed on a first line, a first pressure of the drilling fluid at a first point;

measuring, by a second pressure sensor installed on the first line, a second pressure of the drilling fluid at a second point, the first line having a first entrance valve configured to allow the drilling fluid to flow into the first line, and a first auto clean valve configured to allow the drilling fluid to flow out of the first line;

collecting metal particles from the drilling fluid by energizing an electromagnetic device around at least a portion of the first line;

determining, by a controller operatively connected to the first pressure sensor, the second pressure sensor, the first entrance valve, and the first auto clean valve, that a difference between the second pressure and the first pressure is above a predetermined threshold value;

at least partially opening a second entrance valve configured to allow the drilling fluid to flow into a second line; and closing, by the controller, the first entrance valve to stop the drilling fluid from entering the first line.

11. The method of claim 10, further comprising:

the controller at least partially opening the first auto clean valve to divert the drilling fluid in the first line to an auto clean pump operatively connected to the first auto clean valve via an auto clean line for removal of metal particles from the drilling fluid.

12. The method of claim 11, further comprising:

receiving, by the auto clean pump, the drilling fluid from the first line to remove metal particles from the drilling fluid.

13. The method of claim 11, further comprising:

the controller de-energizing the electromagnetic device after at least partially opening the first auto clean valve to divert the drilling fluid in the first line to the auto clean pump for removal of the metal particles from the drilling fluid.

14. The method of claim 10, further comprising:

providing a third pressure sensor configured to measure a third pressure of the drilling fluid in the second line at an entrance point;

providing a fourth pressure sensor configured to measure a fourth pressure of the drilling fluid in the second line at an exit point;

connecting the controller to the third pressure sensor, the fourth pressure sensor, wherein the controller is configured to:

determine the difference between the third pressure and the fourth pressure is above the predetermined threshold value;

at least partially open the first entrance valve to divert drilling fluid intake from the second line to the first line; and close the second entrance valve to stop the drilling fluid from entering the second line.

15. The method of claim 10, further comprising:

weighing the metal particles in the drilling fluid, by a weighing machine operatively connected to the first auto clean valve via the auto clean line.

16. The method of claim 15, further comprising:
displaying a weight of the metal particles on a human machine interface operatively connected to the controller, and receiving an instruction from an operator.

17. The method of claim 10, wherein the first entrance valve and the second entrance valve comprise a High Closing Ratio or Hydraulic Control Remote (HCR) valve.

18. The method of claim 10, further comprising:
bypassing the auto cleaning system via a bypass line controlled by a third valve connected to the controller.

19. The method of claim 10, further comprising:
installing the auto cleaning system between a mud pump and a standpipe of the drilling rig or between the standpipe of the drilling rig and a shaker.

20. An auto cleaning system for cleaning a drilling fluid in a drilling operation, the auto cleaning system comprising:
a first line comprising a first entrance valve configured to allow the drilling fluid to flow into the first line, a first pressure sensor configured to measure a first pressure of the drilling fluid in the first line at a first point, a second pressure sensor configured to measure a second pressure of the drilling fluid in the first line at a second point, and a first auto clean valve configured to allow the drilling fluid to flow out of the first line;
a second line comprising a second entrance valve configured to allow the drilling fluid to flow into the second line, and a second auto clean valve configured to allow the drilling fluid to flow out of the second line;
an electromagnetic device around at least a portion of the first line, wherein the electromagnetic device is energized when the drilling fluid is passing through the first line; and
an auto clean pump operatively connected to the first auto clean valve and the second auto clean valve via an auto clean line, the auto clean pump configured to receive the drilling fluid from the first line or the second line and remove metal particles from the drilling fluid; and
a controller operatively connected at least to the first entrance valve, the first pressure sensor, the second pressure sensor, the first auto clean valve, the second entrance valve, the second auto clean valve, and the auto clean pump, wherein the controller is configured to:
determine the difference between the second pressure and the first pressure is above a predetermined threshold value;
at least partially open the second entrance valve to divert drilling fluid intake from the first line to the second line; and
close the first entrance valve to stop the drilling fluid from entering the first line.

* * * * *